March 15, 1938.  H. A. SWANSON  2,111,057
PERFORATING MACHINE
Filed Oct. 17, 1935   2 Sheets-Sheet 1
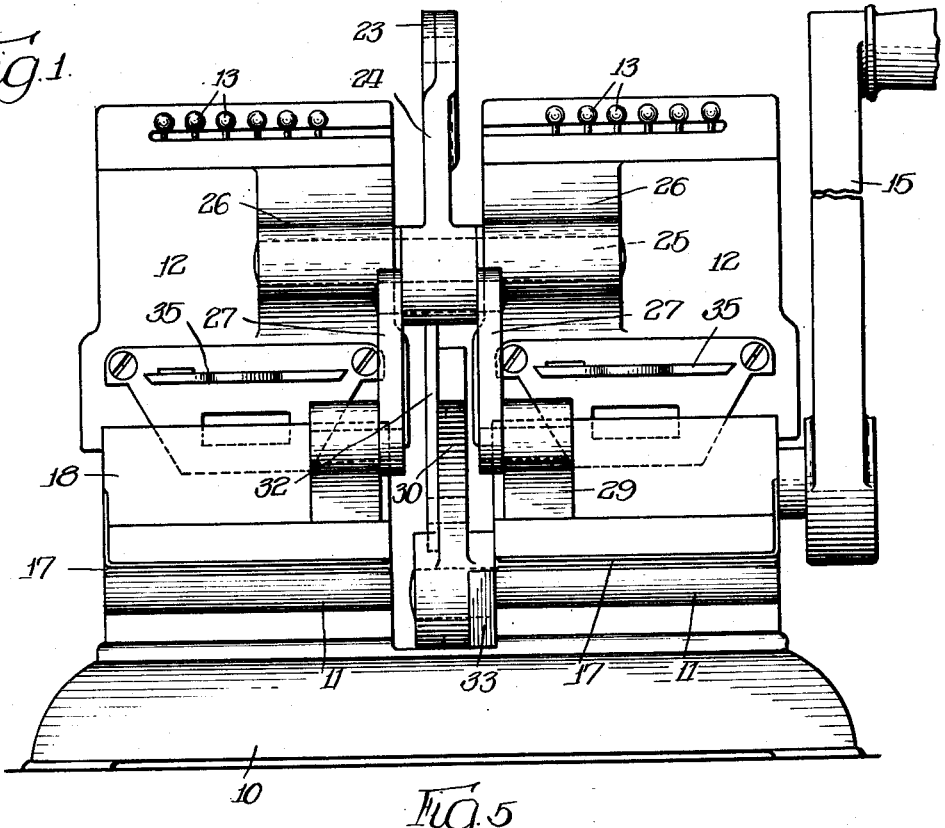
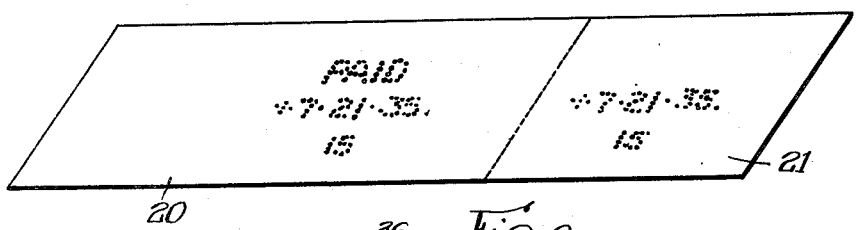
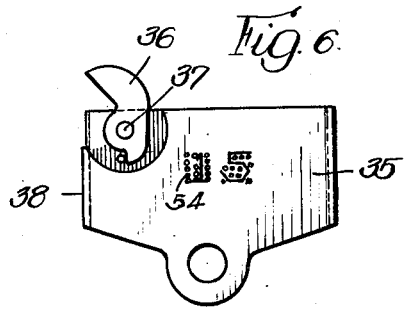
Inventor:
Hjalmar A. Swanson, Inventor:
Hjalmar A. Swanson, Patented Mar. 15, 1938

2,111,057

UNITED STATES PATENT OFFICE 2,111,057

PERFORATING MACHINE

Hjalmar A. Swanson, Chicago, Ill., assignor to Cummins Perforator Company, Chicago, Ill., a corporation of Illinois Application October 17, 1935, Serial No. 45,393

7 Claims. (Cl. 101—297)

The invention relates to perforating machines and is illustrated in connection with a perforating machine for receipting stub bills such as tax bills and those of public service and utility companies by perforating the date of payment and other data in the bills.

Upon payment of a bill by a customer the bill and stub portion thereof is perforated to indicate that the bill has been paid and simultaneously with this operation the stub portion is severed by the perforating machine. This portion is retained and the remainder of the bill is returned to the customer as a receipt. A dishonest employee could heretofore receipt a bill for a customer, destroy the stub portion thereof and appropriate the money to his own use. In large companies the loss due to such practice has been considerable and although the customer is again billed for the amount, since record of the payment was destroyed, he can readily show a receipted bill and the company is left with the problem of finding the dishonest employee.

The invention has for its object to provide removable means for insertion in a perforating machine to permit operation thereof and which when removed will result in locking the machine, preventing operation. In accordance with the invention said removable means consists of a key having indicia perforated therein which will cause an identifying number to be perforated in the bill and stub portion of the same during the operation of receipting the bill. Therefore, the employee receipting the bill and receiving the money can be readily identified through the indicia of his respective key.

A more specific object is to provide a key of relatively small size, weighing but a few ounces, and which can be readily carried in the pocket of the operator when not in use.

With these and various other objects in view, the invention may consist of certain novel features of construction and operation, as will be more fully described and particularly pointed out in the specification, drawings and claims appended hereto.

In the drawings which illustrate an embodiment of the invention and wherein like reference characters are used to designate like parts—

Figure 1 is a front elevational view of a perforating machine showing the same equipped with keys in accordance with the invention;

Figure 5 is a perspective view showing the type of bill perforated by the present form of perforating machine; and Figure 6 is a plan view of a key.

Figure 2:
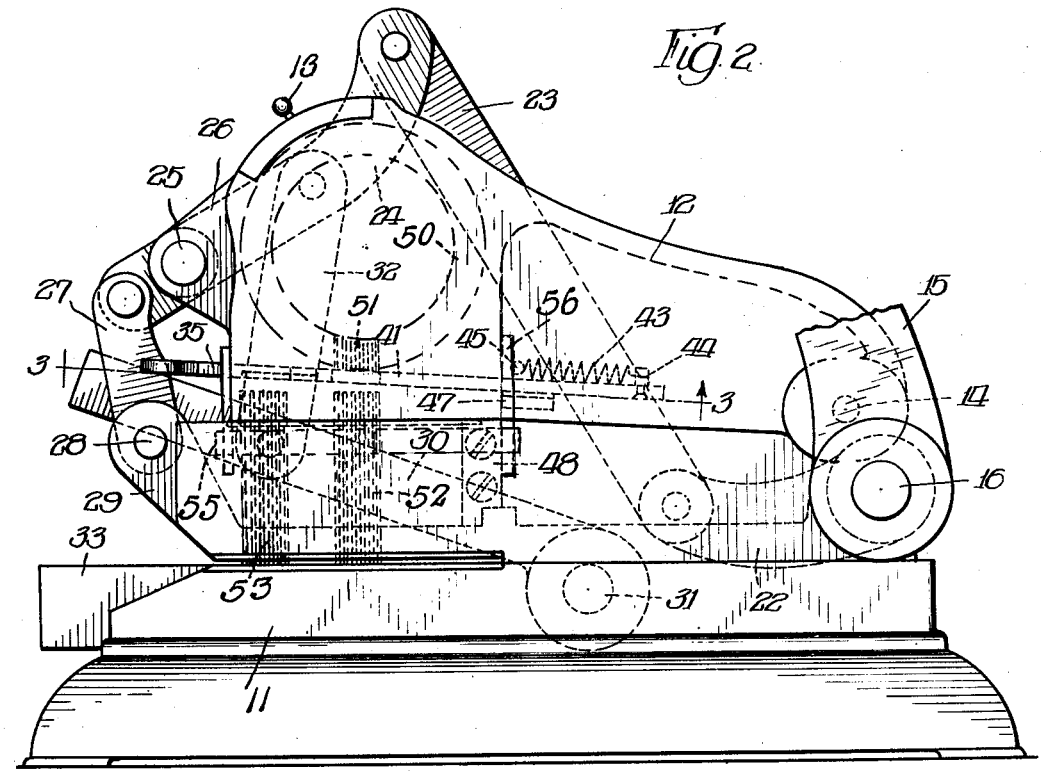
Figure 2 is a side elevation view of the perforating machine showing the key actuated releasing mechanism.

The perforating machine of Figure 1 comprises a base 10 having paper supporting surfaces formed by the die blocks 11 and oscillating head 12, each carrying a number of dies for perforating a bill with various data such as the date, the name or initial of the company, and other desired information, the date being changeable by adjustment of the pins 13. The machine consists of sections of identical construction and spaced so that one section perforates the main portion of the bill and the other section perforates the stub portion. Each oscillating head is pivotally supported, having movement with respect to its rear pivot stud 14, which movement is effected by handle 15, suitably fixed to the projecting end of the operating disc 16. With the handle in raised position, as shown in Figure 1, the die opening 17 is unobstructed to permit the insertion between the punch holders 18 and die plates carried by the blocks 11 of a bill or other form 20, Figure 5, to be perforated by actuation of the handle 15 downwardly, causing downward movement of the selected punch in each head 12. Return movement of the handle lifts the punch to free the form, whereupon the same may be taken from the machine.

The linkage for actuating the oscillating heads 12 upon movement of the handle 15 consists of an arm 22 projecting from shaft 16 and connecting at its free end with the straight link 23. Said link extends diagonally upward between the heads as shown in Figure 1, and connects with the lever 24 which is pivotally mounted intermediate its ends to the heads 12 by means of the shaft 25 supported by journals 26. The outer projecting end of the lever 24 connects with the base 10 of the machine through the links 27, said links being pivoted to the end of the lever and pivotally anchored to the base by means of the shaft 28 journaled in bosses 29. Movement of the heads 12 downwardly also effects operation of an upper cutting blade 30 which is pivoted to the base of the machine as at 31 and connects with lever 24 by the straight link 32. Said upper blade has coaction with a lower stationary blade 33 to sever the stub portion 21 of the bill along the dotted lines. This severing of the bill takes place simultaneously with the perforating operation and the employee returns the main portion of the bill to the customer as a receipt for the money paid and retains the stub portion for the company's records.

Figure 3:
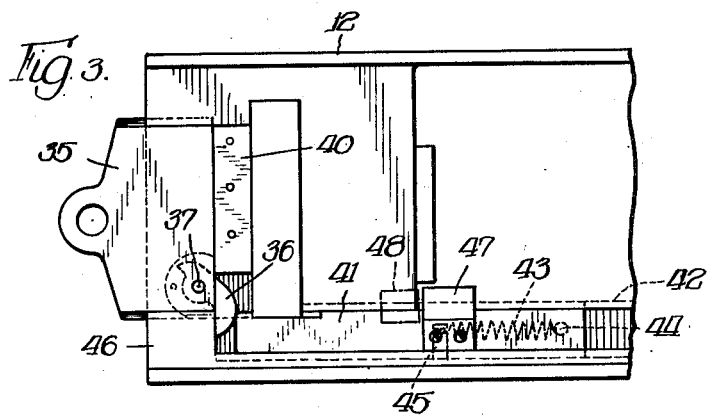
Figure 3 is a fragmentary sectional view taken substantially along line 3—3 of Figure 2 and showing the key in inserted position.

In order that an employee operating the perforating machine may be identified with the bills receipted by him, which would therefore require him to account for all the moneys received, the invention contemplates the provision of keys 35, Figure 6, which must be inserted in the perforating machine before operation of the same can take place and which when in inserted position will result in perforating an identifying number in the receipted bill. A machine requires two keys which are identical in construction, one for each section of said machine. As better shown in Figure 3 said key is provided with a dog 36 having pivotal movement on a pivot stud 37 which additionally holds the dog to the key and prevents loss of the dog when the key is removed from the machine. Said keys are provided with beveled edges 38 and are adapted to fit within their respective slot provided in each section of the perforating machine.

Figure 4:
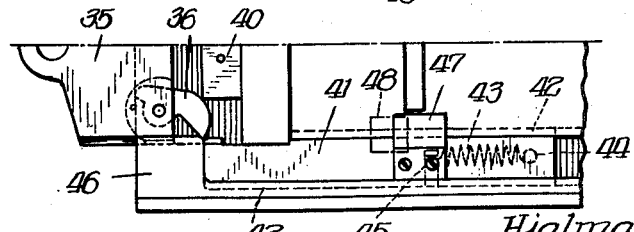
Figure 4 is a fragmentary view similar to Figure 3 but showing the key in withdrawn position.

When the key is initially inserted in its slot the dog naturally assumes a substantially straight line position as will be evident from an inspection of Figure 4. This position of the dog is aided by the stop 40, the corner of which contacts the rounded leading edge of the dog and directs the same toward the locking bar 41, as shown in Figure 4. Said bar is mounted in guides 42 in the head 12 of the machine, and has reciprocating movement in a direction longitudinally thereof. Also the bar is resiliently forced in a direction toward the front of the machine by the coil spring 43, said spring at one end being fixed to the bar by the pin 44 and being held at its other end by the pin 45 carried by the head 12. Forcing the bar forwardly of the machine or toward the left, Figures 3 and 4, serves to hold the left end of the bar in contact with the stop portion 46. Fixed to the bar 41 is a plate member 47 which is located on the bar so as to overlie the stop 48 when the bar is located in its extreme forward position as shown in Figure 4. The plate member takes up the clearance which would otherwise exist between the bar and the stop 48 and since the member directly overlies the stop when the bar is in forward position, which it assumes when the key is removed, it will be seen that downward movement of the oscillating heads 12 is effectively prevented, at least to the extent where perforating of the bill does not occur.

From the foregoing it will be understood that the perforating machine is automatically locked against operation when the key is out of the machine as bar 41 naturally assumes a position forwardly of the machine where the plate member 47 is directly over the stop 48. By inserting a key 35 in each of the heads 12 its respective locking bar 41 is reciprocated to locate the plate member 47 out of alignment with stop 48. This renders it possible to oscillate the heads 12 to their full extent to result in perforating the bill and stub portion thereof located within the die opening 17. Partial insertion of the key 35, as shown in Figure 4, will locate the dog 36 so that its outer end is directed between the locking bar 41 and the stop portion 46. The corners of the bar and stop portion respectively are rounded so as to aid the insertion of the dog 36. When the key 35 has been inserted to its full extent where it contacts the stop 40 the dog 36 will produce a shifting of the locking bar 41 to the right and thus movement of the plate member 47 to the right out of alignment with the stop 48.

The oscillating heads 12 each carry a cylindrical member 50 carrying control members 51 for controlling the actuation of the perforating dies 52 suitably supported within sections 18 of the machine. The control members 51 actuate the proper dies for perforating the bill with the name or initial of the company, date and other desired information and which can be changed by adjustment of the pins 13 as previously described, bringing into operative relation with the perforating dies other control means. Other perforating dies 53 are disposed in sections 18 for actuation by the key 35, it being clear from an inspection of Figure 6 that said key is provided with perforations 54 therein which, however, leave a solid portion bounded by said perforations forming an identifying number. As a result of the perforating operation certain of the dies 53 are actuated by the solid portion of the key above described, perforating the main and stub portion of the bill and reproducing the identifying number therein. Thus the keys when inserted in the machine not only release the locking bars thereof, permitting actuation of the oscillating head 12, but also cause an identifying number to be perforated in the business form, which number results by the arrangement of the perforations in said key. A horizontal lifter plate 55 is suitably suspended from each oscillating head 12 by members 56. Plate 55 carries the perforating dies 52 and 53, supporting the same in upright vertical position. Each perforating die is provided with an upset portion forming a shoulder located above or on the upper side of plate 55. In operation the dies are actuated in a downward direction by the control means 51 and by the key 35 as above described. The actuated dies are retracted, or, in other words, returned to their initial position by the plate 55 which engages with the shoulder portion on the dies, the said plate having movement with the oscillating head to which it is attached.

It is to be understood that each employee operating the perforating machine will have a set of keys bearing his identifying number. With the exception of the different numbers perforated in the keys they are identical in construction and therefore all effect actuation of the locking bar to release the oscillating heads, permitting movement thereof. However, since the main portion of the bill and the stub portion thereof are both perforated with the number of the inserted keys, the company can readily identify the particular employee in the event of falsification of the records and appropriation of money for his own use. The key is relatively small and can be kept in the vest pocket of the employee until ready for use. Although the dog 36 is given proper rotation by insertion of the key to effect movement of the locking bar it is extremely difficult to cause movement of this locking bar by other instruments and thus the mechanism is substantially fool-proof. The parts going to make up the locking mechanism are relatively simple, although in operation a positive lock is provided absolutely preventing downward movement of the oscillating heads 12. Although excessive pressure may be brought to bear in an attempt to break the locking mechanism this can not be done as the plate member 47 and stop 48 are designed to sustain an enormous compressive force and failure would occur in other parts of the machine before the lock would give way.

The present locking mechanism is constructed to make it extremely difficult to manipulate the same unless the proper key or an exact duplicate of it is used. The inside edge of the movable bar 41 is not parallel with the outside edge of the key channel but is set back a slight distance. Therefore it is not possible to insert a wire or a strip of metal to effect contact and movement of said bar. This is an important feature in the construction and operation of the present lock since a key of almost the same shape with a dog of exactly the same shape as an original key is required.

In the drawings a duplex perforating machine has been disclosed and in the description of the same it has been stated that two keys are employed to effect an unlocking of the respective perforating mechanism which produces perforations in the main portion of the bill and stub portion. In many instances it may be desirable to perforate the identifying character or number of the employee in the main portion of the bill only since the greatest advantage will be in establishing the identity of the employee receipting the bill and thus the invention is not to be limited to the use of two keys since in the situation stated a single key for that section of the perforator perforating the main portion of the bill is all that would be required.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a perforating machine for stub bills and similar business forms, means locking the machine to prevent a perforating operation, a key for insertion in said machine to release the locking means permitting operation, said key having indicia perforated therein and which will cause an identifying number to be perforated in the business form upon operation of the machine.

2. In a perforating machine for stub bills and similar business forms, a locking bar for locking the machine to prevent a perforating operation, a key for insertion in said machine to release the locking bar permitting operation, said key having indicia perforated therein and which will cause an identifying number to be perforated in the business form upon operation of the machine.

3. In a perforating machine for stub bills and similar business forms, a locking bar, resilient means holding the bar in locking position to prevent a perforating operation, a key for insertion in said machine to effect release of the locking bar permitting operation, said key having indicia perforated therein and which will cause an identifying number to be perforated in the business form upon operation of the machine.

4. In a perforating machine of the duplex type for receipting stub bills and similar business forms, a locking bar for each section of the machine for locking said section preventing a perforating operation, a key for insertion in each section of the machine to release said locking bars permitting operation thereof, each key having indicia perforated therein and which will cause an identifying number to be perforated in the business form upon operation of the machine.

5. In a perforating machine of the duplex type for receipting bills having a stub portion, said machine including oscillating heads of identical construction for perforating the bill and stub portion thereof, a locking bar provided in each oscillating head for locking said head preventing a perforating operation, a key for insertion in each of the heads to release its respective locking bar permitting operation thereof, each key having indicia perforated therein and which will cause an identifying number to be perforated in the business form upon operation of the machine.

6. A perforating machine for stub bills and similar business forms, perforating dies carried by said machine for perforating said business forms upon operation of the machine, a locking member for locking the machine to prevent a perforating operation, a key for insertion in said machine to release the locking member permitting operation, said key when fully inserted in said machine having a part disposed over certain perforating dies, and said part of the key having indicia perforated therein leaving a solid portion bounded by the perforations causing actuation of certain dies to perforate an identifying number in the business form upon operation of the machine.

7. A perforating machine of the duplex type having oscillating heads, perforating dies carried by each head and having operation to perforate a business form upon downward oscillating movement of the head, locking means for each head to prevent movement thereof downwardly to perform said perforating operation, a key for insertion in each head to release the locking means permitting operation, each key when fully inserted in said machine having a part disposed over certain perforating dies, and said part of the key having indicia perforated therein leaving a solid portion bounded by the perforations causing actuation of certain dies to perforate an identifying number in the business form upon operation of the machine.

HJALMAR A. SWANSON.